US 8,819,055 B2
Aug. 26, 2014

(12) United States Patent
Rangaswamy et al.

(54) SYSTEM AND METHOD FOR LOGICAL PEOPLE GROUPS

(75) Inventors: Ravi Rangaswamy, Fremont, CA (US); Vladimir Svetov, Foster City, CA (US); Mohan Kamath, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 12/780,214

(22) Filed: May 14, 2010

(65) Prior Publication Data

US 2011/0282895 A1 Nov. 17, 2011

(51) Int. Cl.
*G06F 17/30* (2006.01)

(52) U.S. Cl.
USPC .................. 707/769; 707/736; 707/781

(58) Field of Classification Search
CPC ............ G06F 11/3006; G06F 17/3089; G06F 17/30477; G06F 17/30979
USPC .................. 707/769, 736, E17.014, 781
See application file for complete search history.

(56) References Cited

U.S. PATENT DOCUMENTS

| 5,721,913 | A  | 2/1998  | Ackroff et al.       |
|-----------|----|---------|----------------------|
| 5,799,297 | A  | 8/1998  | Goodridge et al.     |
| 5,978,836 | A  | 11/1999 | Ouchi                |
| 6,003,011 | A  | 12/1999 | Sarin et al.         |
| 6,026,365 | A  | 2/2000  | Hayashi              |
| 6,161,113 | A  | 12/2000 | Mora et al.          |
| 6,170,002 | B1 | 1/2001  | Ouchi                |
| 6,308,224 | B1 | 10/2001 | Leymann et al.       |
| 6,397,182 | B1 | 5/2002  | Cruickshank et al.   |
| 6,397,191 | B1 | 5/2002  | Notani et al.        |
| 6,470,227 | B1 | 10/2002 | Rangachari et al.    |
| 6,507,845 | B1 | 1/2003  | Cohen et al.         |
| 6,519,642 | B1 | 2/2003  | Olsen et al.         |
| 6,567,783 | B1 | 5/2003  | Notani et al.        |
| 6,574,675 | B1 | 6/2003  | Swenson              |
| 6,574,736 | B1*| 6/2003  | Andrews ........ 726/21 |
| 6,584,487 | B1 | 6/2003  | Saboff               |
| 6,606,740 | B1 | 8/2003  | Lynn et al.          |
| 6,742,015 | B1 | 5/2004  | Bowman-Amuah         |
| 6,889,231 | B1 | 5/2005  | Souder et al.        |
| 6,895,573 | B2 | 5/2005  | Norgaard et al.      |
| 6,970,844 | B1 | 11/2005 | Bierenbaum           |
| 7,020,697 | B1 | 3/2006  | Goodman et al.       |
| 7,062,749 | B2 | 6/2006  | Cyr et al.           |

(Continued)

OTHER PUBLICATIONS

Kuleshov, I., Human Tasks Allocation Manager, 2009, Exadel Inc., http://exadelfs.com/knowledgebase/whitepapers/ExadelFS-Human-Tasks-Allocation-Manager-3-0.pdf, 5 pages.

(Continued)

*Primary Examiner* — Shiow-Jy Fan (74) *Attorney, Agent, or Firm* — Meyer IP Law Group (57) ABSTRACT

A system for managing a logical people group. The system comprises a computer, including a computer readable medium and processor operating thereon. The system also comprises a query module, executing on the computer, operable to receive a complex query and return a logical group of users. The query module is operable to search, based on the complex query, across a plurality of information sources including a user directory, a plurality of roles, and an attribute directory. The system also comprises a query cache which stores, for a user-definable period, a reverse lookup table of users and the logical groups to which the users belong based on previously received complex queries.

19 Claims, 7 Drawing Sheets

(56) References Cited

U.S. PATENT DOCUMENTS

| | | |
|---|---|---|
| 7,236,939 B2 | 6/2007 | Chen et al. |
| 7,272,816 B2 | 9/2007 | Schulz et al. |
| 7,289,966 B2 | 10/2007 | Ouchi |
| 7,370,335 B1 | 5/2008 | White et al. |
| 7,403,989 B2 | 7/2008 | Beringer et al. |
| 7,406,432 B1 | 7/2008 | Motoyama |
| 7,418,475 B2 | 8/2008 | Stewart et al. |
| 7,428,495 B2 | 9/2008 | Dhar et al. |
| 7,448,046 B2 | 11/2008 | Navani et al. |
| 7,464,366 B2 | 12/2008 | Shukla et al. |
| 7,493,593 B2 | 2/2009 | Koehler |
| 7,498,866 B2 | 3/2009 | Choi |
| 7,519,711 B2 | 4/2009 | Mohindra et al. |
| 7,543,292 B2 | 6/2009 | Haller et al. |
| 7,603,674 B2 | 10/2009 | Cyr et al. |
| 7,631,291 B2 | 12/2009 | Shukla et al. |
| 7,676,483 B2 | 3/2010 | Klug |
| 7,680,683 B2 | 3/2010 | Hilerio et al. |
| 7,685,604 B2 | 3/2010 | Baartman et al. |
| 7,702,736 B2 | 4/2010 | Ouchi |
| 7,814,142 B2 | 10/2010 | Mamou et al. |
| 7,925,527 B1 | 4/2011 | Flam |
| 8,146,083 B2 | 3/2012 | Aggarwal et al. |
| 8,170,897 B1 | 5/2012 | Cohen et al. |
| 2002/0140731 A1 | 10/2002 | Subramaniam et al. |
| 2002/0178119 A1* | 11/2002 | Griffin et al. ............... 705/54 |
| 2002/0189070 A1 | 12/2002 | Noel et al. |
| 2003/0046576 A1* | 3/2003 | High et al. ............... 713/200 |
| 2003/0105974 A1* | 6/2003 | Griffin et al. ............... 713/200 |
| 2003/0135384 A1 | 7/2003 | Nguyen |
| 2003/0158832 A1 | 8/2003 | Sijacic et al. |
| 2004/0230466 A1 | 11/2004 | Davis et al. |
| 2005/0027585 A1 | 2/2005 | Wodtke et al. |
| 2005/0049924 A1 | 3/2005 | DeBettencourt et al. |
| 2005/0071347 A1 | 3/2005 | Chau et al. |
| 2005/0097166 A1* | 5/2005 | Patrick et al. ............... 709/203 |
| 2006/0069995 A1 | 3/2006 | Thompson et al. |
| 2006/0074703 A1 | 4/2006 | Bhandarkar et al. |
| 2006/0074734 A1 | 4/2006 | Shukla et al. |
| 2006/0074915 A1 | 4/2006 | Bhandarkar et al. |
| 2006/0150156 A1 | 7/2006 | Cyr et al. |
| 2006/0173869 A1* | 8/2006 | Byrne et al. ............... 707/100 |
| 2006/0218394 A1 | 9/2006 | Yang |
| 2006/0229925 A1 | 10/2006 | Chalasani et al. |
| 2007/0016465 A1 | 1/2007 | Schaad |
| 2007/0061382 A1 | 3/2007 | Davis et al. |
| 2007/0156486 A1 | 7/2007 | Sanabria et al. |
| 2007/0203589 A1 | 8/2007 | Flinn et al. |
| 2007/0203881 A1 | 8/2007 | Schaad et al. |
| 2007/0239499 A1 | 10/2007 | Shukla et al. |
| 2007/0240112 A1 | 10/2007 | Haselden et al. |
| 2007/0276715 A1 | 11/2007 | Beringer et al. |
| 2008/0065656 A1 | 3/2008 | Theeten et al. |
| 2008/0114627 A1 | 5/2008 | Baeuerle et al. |
| 2008/0301684 A1 | 12/2008 | Barros et al. |
| 2008/0306806 A1 | 12/2008 | Van Wyk et al. |
| 2009/0125366 A1 | 5/2009 | Chakraborty et al. |
| 2009/0164985 A1 | 6/2009 | Balko et al. |
| 2009/0199293 A1 | 8/2009 | Song et al. |
| 2009/0260021 A1 | 10/2009 | Haenel et al. |
| 2009/0281855 A1 | 11/2009 | Shuler et al. |
| 2009/0307162 A1 | 12/2009 | Bui et al. |
| 2010/0049574 A1 | 2/2010 | Paul et al. |
| 2010/0100427 A1 | 4/2010 | McKeown et al. |
| 2010/0106546 A1 | 4/2010 | Sproule |
| 2010/0205013 A1 | 8/2010 | Guyan et al. |
| 2010/0235213 A1 | 9/2010 | Channabasavalah et al. |
| 2010/0251242 A1 | 9/2010 | Sivasubramanian et al. |
| 2011/0078499 A1 | 3/2011 | Fong et al. |

OTHER PUBLICATIONS

Bradshaw, D. et al., Oracle BPEL Process Manager Developer's Guide lOg (10.1.3.1.0), Jan. 2007, 295 pages.
Beecher, V. et al., Oracle Fusion Middleware Developer's Guide for Oracle SOA Suite, 11g, Dec. 2009, 374 pages.
Oracle Database Administrator's Guide 11g, Oracle, 2009, 40 pages.
Oracle BPEL Process Manager—Data Sheet, Oracle, 2009, 4 pages.
Rittman, M., Oracle Purchases Collaxa, Launches Oracle BPEL Process Manager, RittmanMead.com, Jun. 30, 2004, 7 pages.
Clugage, K. et al., The Oracle BPEL Process Manager: BPEL + Human Workflow, Oracle, Mar. 14, 2006.
BPEL4People—Wikipedia definition, Wikipedia.org, Apr. 10, 2012, 3 pages.
Kloppman, M. et al., WS-BPEL Extension for People—BPEL4People, IBM, SAP, White paper, Jul. 2005, 18 pages.
Collaxa WSOS 2.0: An Introduction, Colaxa, Sep. 6, 2002, 23 pages.
Kennedy, M., Oracle BPEL Process Manager Quick Start Guide, 10g, Oracle, Sep. 2006, 60 pages.
Liu, S., Business Process Automation and Web Service Choreography, Technische Universitat Hamburn-Harburg, Jun. 29, 2004, 43 pages.
Collaxa—Orchestration Server Developer's Guide Version 2.0 Beta 2, Collaxa, 2002, 242 pages.
Kloppman, M. et al., WS-BPEL Extension for Sub-Processes—BPEL SPE, IBM, SAP, Sep. 2005, 17 pages.
Agrawal, A. et al., Web Service Human Task (WS-Human Task), Version 1.0, Active Endpoints, Inc., 2007, 133 pages.
Agrawal, A. et al., WS-BPEL Extension for People (BPEL4People), Version 1.0, Active Endpoints, Inc., 2007, 52 pages.
Workflow Management Coalition—Workflow Standard—Interoperabilitity Abstract Specification Copyright 1999 The Workflow Management Coalition, Version 2.0b, Nov. 30, 1999.

* cited by examiner

300 | peopleQuery name1: jcooper, jstein

302 | groupQuery: groups: California, LoanAgent

304 | groupQuery: AppRoles: soa-infra/BPMWorkflowAdmin, app1/DemoAppRole

306 | peopleQuery:
getGrantees to group soaWorkflow with FILTER (att1=value 1 AND att2=value 2)

308 | peopleQuery:
getGrantees to group soaWorkflow with FILTER (att1=value 1 AND att2=value 2)
with PROPERTIES (property1=Value1 AND property2=Value2)

```
<peopleQuery>
    <searchUsers>
        <attribute name="att1" value="$value" />
    </searchUsers>
</peopleQuery>
```

502

```
<peopleQuery>
    <searchUsers>
        <attribute name="att1" value="$arg1" />
    </searchUsers>
    <userPredicate>
        <lhs>
            <clause>
                <property>region</p:property>
                <operator>EQ</p:operator>
                <value>WEST</p:value>
            </clause>
        </lhs>
        <logicalOperator>AND</p:logicalOperator>
        <rhs>
            <clause>
                <property>department</p:property>
                <operator>EQ</p:operator>
                <value>$arg2</p:value>
            </clause>
        </rhs>
    </userPredicate>
</peopleQuery>
```

504

```
<peopleQuery>
    <reportees>
        <user>wfaulk</user>
        <level>2</level>
    </reportees>
</peopleQuery>
```

```
<peopleQuery>
    <searchUsers>
        <filter>
            <lhs>
                <condition>
                    <attribute>at1</attribute>
                    <operator>EQ</operator>
                    <value>$arg1</value>value>
                </condition>
            </lhs>
            <logicalOperator>AND</p:logicalOperator>
            <rhs>
                <condition>
                    <attribute>at2</attribute>
                    <operator>EQ</operator>
                    <value>@arg2</value>value>
                </condition>
            </rhs>
        </filter>
    </searchUsers>
</peopleQuery>
```

602

```
<peopleQuery>
    <grantees>
        <role>BPMWorkflowAdmin</role>
        <application>soa-infra</application>
        <direct>false</direct>
    </grantees>
    <userPredicate>
        <clause>
            <property>region</p:property>
            <operator>EQ</p:operator>
            <value>WEST</p:value>
        </clause>
    </userPredicate>
</peopleQuery>
```

SYSTEM AND METHOD FOR LOGICAL PEOPLE GROUPS

CROSS REFERENCE TO RELATED APPLICATIONS

This application is related to the following patent applications, which are each hereby incorporated by reference in their entirety:

U.S. patent application Ser. No. 12/780,183, entitled COMPLEX ACCESS CONTROL, by Vladimir Svetov et al., filed May 14, 2010;

U.S. patent application Ser. No. 12/780,340, entitled INTEGRATING EXTERNAL DATA IN HUMAN WORKFLOW TASK, by Ravi Rangaswamy et al., filed May 14, 2010;

U.S. patent application Ser. No. 12/780,661, entitled FLEXIBLE CHAINING OF DISPARATE HUMAN WORKFLOW TASKS IN A BUSINESS PROCESS, by Ravi Rangaswamy et al., filed May 14, 2010;

U.S. patent application Ser. No. 12/780,348, entitled WORKFLOW TASK ROUTING BASED ON CARDINALITY OF TASK DATA, by Ravi Rangaswamy et al., filed May 14, 2010;

U.S. patent application Ser. No. 12/780,356, entitled DYNAMIC HUMAN WORKFLOW TASK ASSIGNMENT USING BUSINESS RULES, by Ravi Rangaswamy et al., filed May 14, 2010;

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to users and user groups in business processes, and particularly to a system and method for logical people groups.

BACKGROUND

Business processes, which may also be referred to as business flows or workflows, provide a level of abstraction above programming languages such as Java or C++, making them easier for non-programmers to use to describe desired processing within a particular business process. Example languages used to define business processes include, for example, the Business Process Execution Language (BPEL), which is an XML-based executable language for specifying orchestration between web services that comprise a business process; Business Process Modeling Notation (BPMN), and/or BPM.

Figure 1:
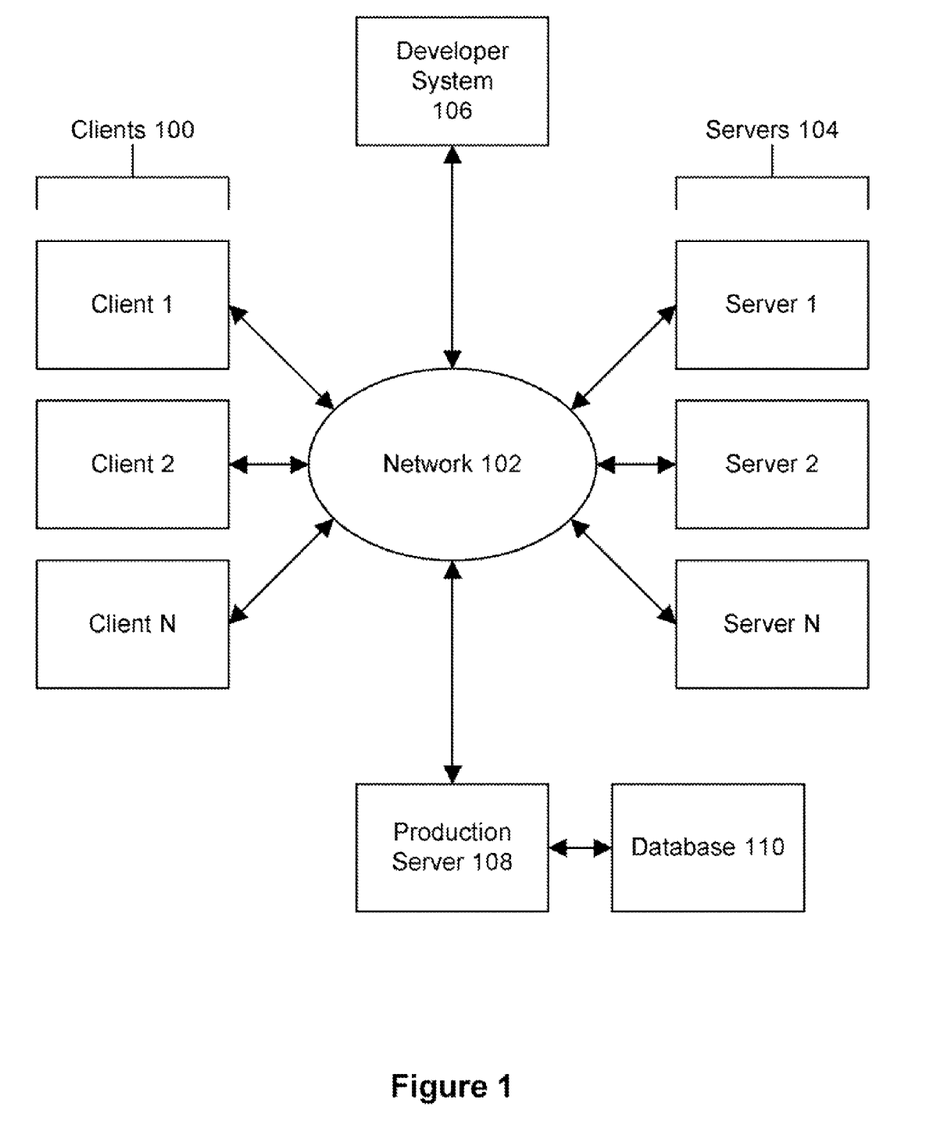
FIG. 1 shows an illustration of a typical networked computing environment.

FIG. 1 shows an illustration of a typical networked computing environment. As shown in FIG. 1, a typical networked computing environment can include a plurality of clients 100, such as Client 1, Client 2, and Client N connected to a network 102, such as the Internet. The clients can be, for example, personal computers, workstations, mobile computing devices, or any other networkable device. Also connected to the network are a plurality of servers 104 such as Server 1, Server 2, and Server N. These servers can include application servers and web servers which provide services in response to requests that are received over the network from the clients or other servers or services. A developer system 106 can provide a software developer with access to the network to create, modify, and/or deploy business processes, which can then be utilized by the plurality of clients. The developer can deploy the business processes to a production server 108, which is typically a computer server system that stores and executes the business processes. The production server can access additional business processes stored in a database 110. The production server can receive service requests from the plurality of clients, or the plurality of servers, and execute an appropriate business process. Execution of the appropriate business process can include invoking one or more web services offered by the plurality of servers.

Business processes are comprised of activities. Each activity defines actions and logic to be executed. Activities can contain other activities, and such activities are referred to herein as container activities. Each container activity includes one or more contained activities which can either be primitive activities (i.e., activities which do not contain any additional activities) or another container activity.

Activities within the business processes can assign tasks to be completed by a user or a group of users before execution of the business process can continue. These groups of users may be defined by a variety of attributes including job, location, expertise, etc.

However, current systems cannot search across multiple sources. Instead, current systems search only in user directories. Although some business attributes can be pushed to user directories, this can result in duplicate information and can require changes to an enterprise's user directory structure, which is often impractical.

SUMMARY

A system is provided for managing a logical people group. The system comprises a computer, including a computer readable medium and processor operating thereon. The system also comprises a query module, executing on the computer, operable to receive a complex query and return a logical group of users. The query module is operable to search, based on the complex query, across a plurality of information sources. The sources can include a user directory which maps a plurality of users to a plurality of groups, a plurality of roles, wherein each role is associated with an application and includes one or more users from the plurality of users, and an attribute directory which includes plurality of attributes for each of the plurality of users. The system also comprises a query cache which stores, for a user-definable period, a reverse lookup table of users and the logical groups to which the users belong based on previously received complex queries.

DETAILED DESCRIPTION

A system is provided for managing a logical people group. The system comprises a computer, including a computer readable medium and processor operating thereon. The system also comprises a query module, executing on the computer, operable to receive a complex query and return a logical group of users. The query module is operable to search, based on the complex query, across a plurality of information sources. The sources can include a user directory which maps a plurality of users to a plurality of groups, a plurality of roles, wherein each role is associated with an application and includes one or more users from the plurality of users, and an attribute directory which includes plurality of attributes for each of the plurality of users. The system also comprises a query cache which stores, for a user-definable period, a reverse lookup table of users and the logical groups to which the users belong based on previously received complex queries.

In accordance with an embodiment, business processes can include tasks to be completed or managed by particular users, or by particular groups of users. According to the requirements of a given task, an appropriate user or group may need to be defined according to specific skills or status. These user details can be stored in an enterprise's identity store, such as a Lightweight Directory Access Protocol (LDAP) directory but can also be stored in other locations such as a business or user attribute directory, or a role directory. In order to assign a task to a user or group that can complete the task, participants in some automated business processes are defined by complex queries which define the skills and status users need to complete the task. At execution, the complex query is evaluated to return the users or groups assigned to the task.

A complex query can define a group based on a variety of relevant user details which can be stored in multiple, disparate directories and databases. Therefore, for a given complex query, information can be requested related to users and groups defined in user directories like LDAP, roles as defined in applications or a security layer, and business attributes of users and groups that are stored outside of LDAP. For example, participants can be all users in role "InsuranceAgents" who live in "California" (location found in the user directory) and whose expertise is "Home Insurance" (a user attribute stored outside the user directory). However, previously no unified query languages were operable to search across multiple sources.

Although some user attributes can be added or pushed to a user directory, this can result in duplicate information (stored in a user attribute database and the user directory) and in most cases it is impractical to change the user directory structure.

Figure 2:
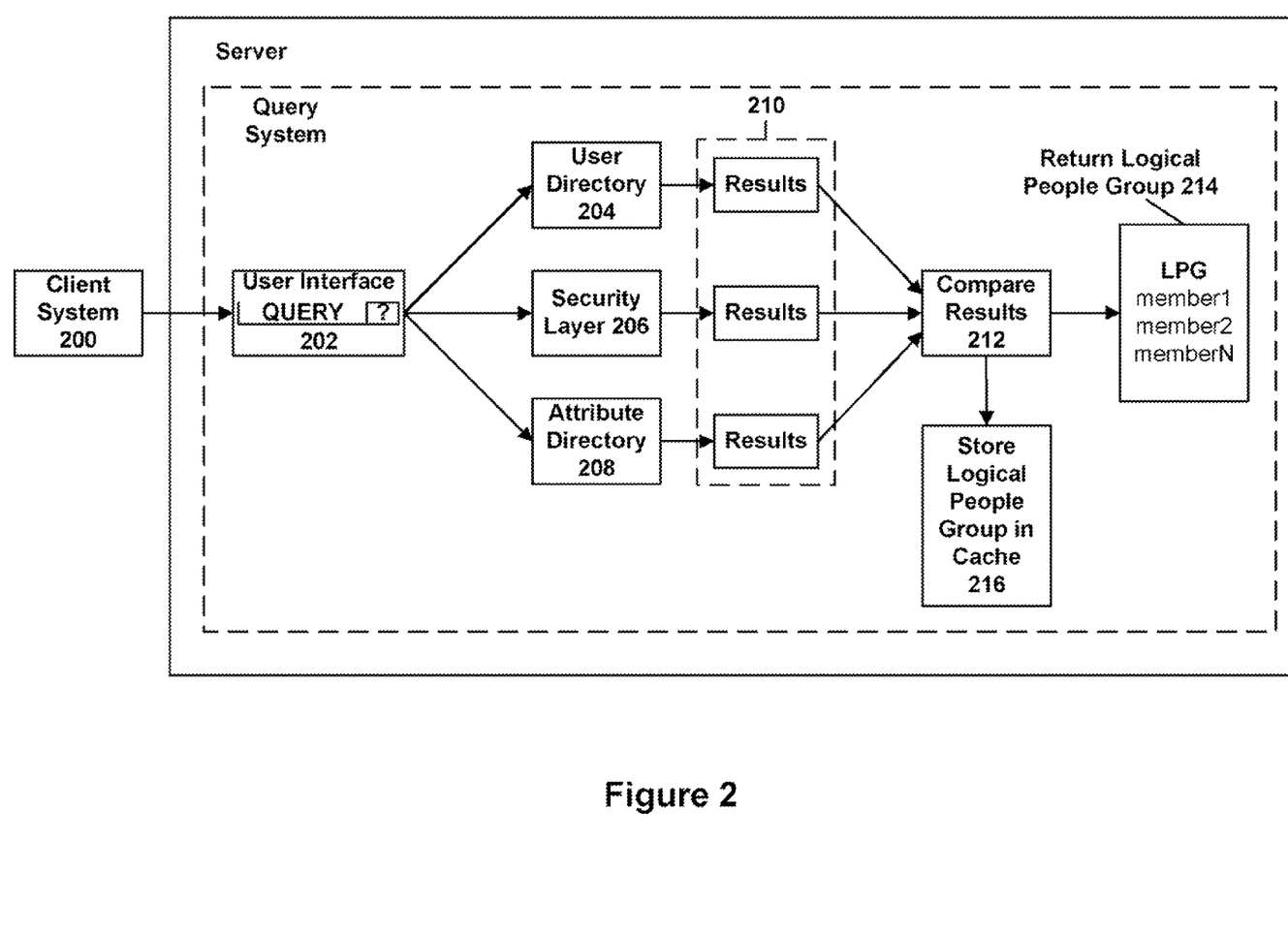
FIG. 2 shows a system for managing a logical people group, in accordance with an embodiment.

FIG. 2 shows a system for managing a logical people group, in accordance with an embodiment. Client System 200 can access a query module at a server through a user interface 202. The client system can define a logical people group by entering a query that includes the particular attributes and properties that members of the group should have. The system then conducts a search across several directories including a User Directory 204, a Security Layer 206, and an Attribute directory 208. The user directory can be any identity store including LDAP and RDBMS directories. The attribute directory can be a separate database which includes user or business attributes that are not included in the user directory. The security layer can include additional, security related attributes. Results 210 are determined from searching each directory and the results are compared at 212. The users or groups that survive the comparison are the members of the logical people group defined by the query. The resulting group is returned 214 to the client system. The resulting group can also be stored in a query cache 216. The query cache can improve performance by tracking membership in the logical people groups, so that the query does not have to be executed again for each request.

In accordance with an embodiment, each query can include multiple statements joined by logical operands. For example, each statement can be specific to a particular data source (e.g., user directory, RDBMS, etc). During execution of the query, each statement is executed on its respective data source, and the results are aggregated based on the logical operand to yield the eventual result of the query itself. The physical location of the database or the user directory to execute the query is not in the query itself, but it is in the application.

Task assignees can be made using logical people groups (LPGs). In accordance with an embodiment, an LPG is a named list that represents users or groups defined in an identity service, such as an LDAP directory, that is available at runtime. Rather than naming the particular users or groups to manage processes and/or tasks, these users or groups can be referred to indirectly. Each LPG can be defined in terms of a query. The query can define the LPG statically or include parameters that are evaluated at runtime. Such parameters can include "customer service representative from region one" or "department name".

In accordance with an embodiment, queries can be constructed differently for different LPGs. For example, an LPG that includes users can be defined using a people query while an LPG that includes groups of users can be defined using a group query. People queries and group queries can be constructed using different query-specific functions, as further described below.

A unified query language can be used to search across multiple sources including a user directory, roles in applications and business attributes. This enables LPGs to be carefully defined using user attributes that are stored in different directories or databases. Business process architects and designers can define participants using this query language as custom, fine-grain groups. This can enable customers to define workflow task participants with particularity, according to the specific needs of a given task.

In accordance with an embodiment, queries can include searches, e.g. for: users by attribute or filter; members of a group or role; reportees; managers of users; management chains; managers of groups; owners of groups; and all users, based on properties defined in the query. Other types of queries can include additional searches based on other user or group features.

The results of a particular query can be a set of users or groups of users. This set of users of groups of users make up the LPG defined by the particular query.

In accordance with an embodiment, a query can be received which searches users on the basis of an attribute. In the query, the attribute may be specified by name. At runtime, the attribute's name can be dynamically replaced by the attribute value associated with that name using a context map. This query can be applied to an identity store, such as an LDAP directory, and return a set of users. This set of users can be further searched based on other user attributes that may not be included in an LDAP directory but can be stored in another data store. This can be done using user predicates which further filter the set of users based on additional attributes. The user predicates can also include arguments that are specified by name in the query and dynamically replaced by a value at runtime using a context map.

Figure 3:
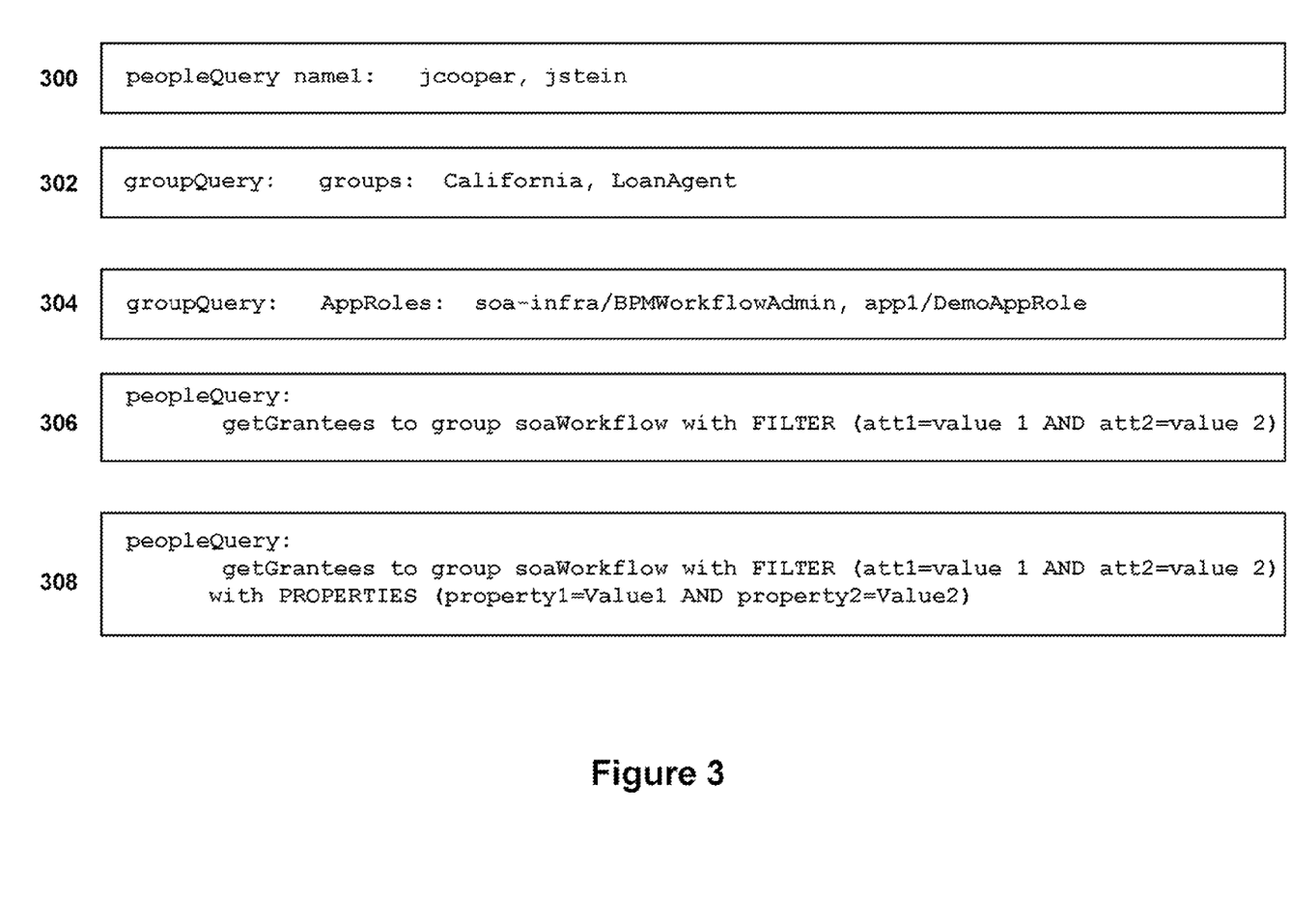
FIG. 3 shows exemplary people queries and group queries, in accordance with an embodiment.

FIG. 3 shows exemplary people queries and group queries, in accordance with an embodiment. LPGs can be defined statically as a user list. An example of a statically defined LPG using a people query is shown at 300 which defines an LPG that includes users 'jcooper' and 'jstein'. Similarly, a group query can be used to define an LPG which includes predefined groups of users. At 302, an LPG is statically defined as comprising two groups: a California group, which includes users located in California; and a LoanAgent group, which includes users having the attribute LoanAgent. Additionally, LPGs can be defined in terms of statically defined roles. This can be defined using a group query and is shown at 304. At 304, the group query is statically defined to include two roles, each defined from an application. The two shown roles are BPM-WorkflowAdmin from the soa-infra application and DemoAppRole from app1. Roles used by a security layer can also be incorporated into the queries. The LPG definitions shown in FIG. 3 are exemplary, and simplified for clarity. More complex query definitions are also within the scope of embodiments of the present invention.

As further shown in FIG. 3, LPGs can also be defined as members of a group who possess additional attributes or properties. At 306, a people query is shown that defines an LPG as members of the group 'soaWorkflow' who also include attributes 'att1' and 'att2'. At 308, an LPG is further defined to further filter members who include properties 'property1' and 'property2'. As described above, user attributes may be stored in an enterprise's identity store, such as an LDAP directory, while user or business properties may be stored in a separate user attribute database. The query shown at 308 searches across both data sources to generate the resulting LPG.

In accordance with an embodiment, each people query and group query can be constructed using several functions. People queries can include functions specific to users such as a function to determine a user's manager or the users who are members of a specified group or role. Similarly, group queries can include functions specific to groups such as identifying grantees and granted roles to a particular group.

Figure 4:
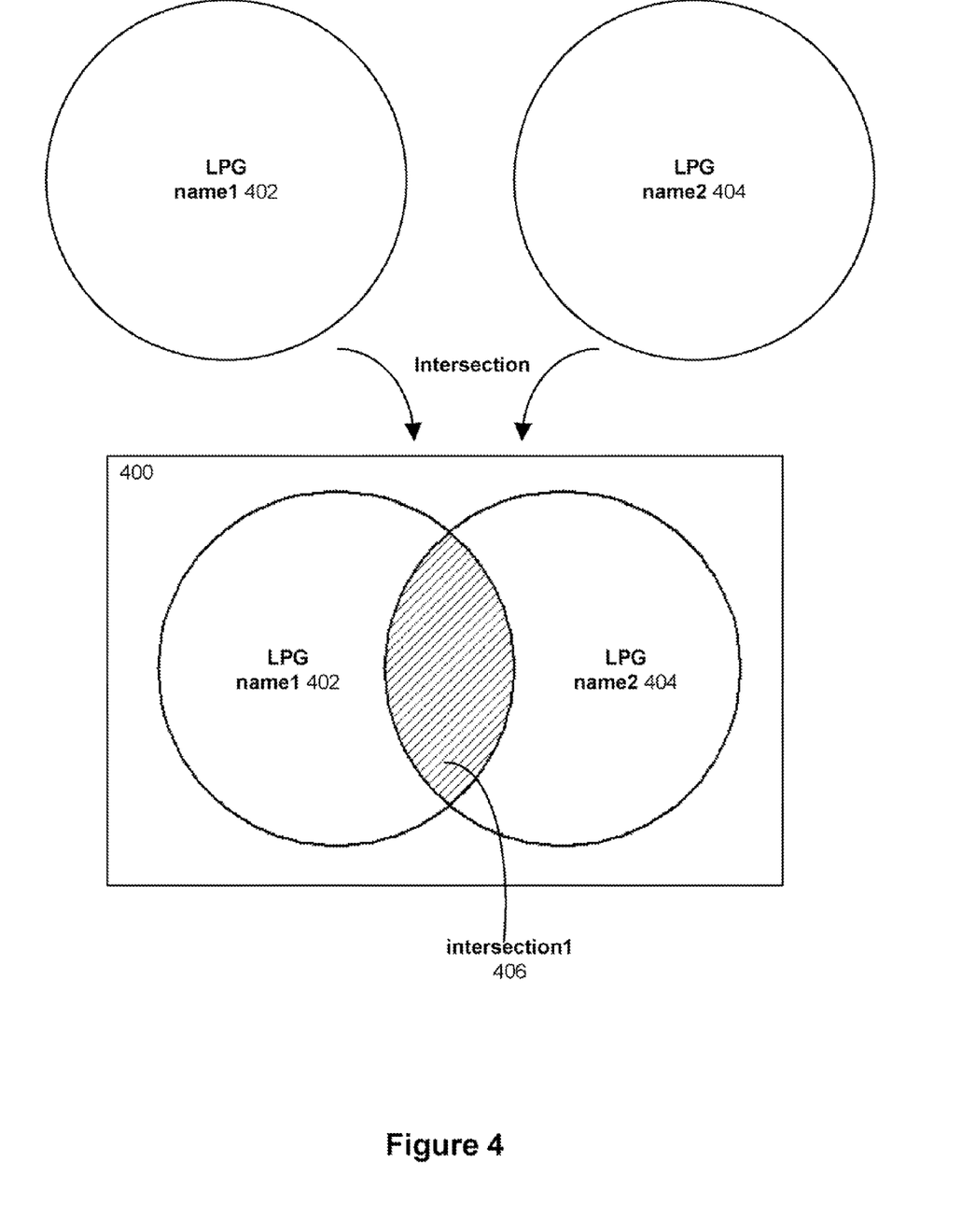
FIG. 4 shows an intersection of Logical People Groups

FIG. 4 shows an intersection of Logical People Groups. As shown in FIG. 4, an LPG can be defined 400 as the intersection of other LPGs. For example, LPG 'intersection1' can be defined as the intersection of an LPG 402 defined by people query 'name1' and an LPG 404 defined by people query 'name2'. Thus, intersection1 406 would be all of the users common to both LPGs name1 and name2, as indicated in FIG. 4. The same can also be applied to group queries. Other logical combinations of multiple LPGs can also be defined, such as unions.

As described above, LPGs can also be mapped to one or more users. In accordance with an embodiment, these mappings can also be a statically defined group of users or defined by a people query that is evaluated at runtime. People queries include two parameters user attributes and user properties. User attributes are part of the user's schema or repository (such as LDAP or RDBMS). These attributes are expressed as name-value pairs and can be used in a logical expression in query predicates. User properties are defined in a business process schema but are not defined in the user's schema or repository. The user properties provide an extension to the user attributes without requiring any modifications to an enterprise's existing user schema or repository. When a people query or a group query is defined, the user can name the query and choose whether to make the query visible.

Figure 5:
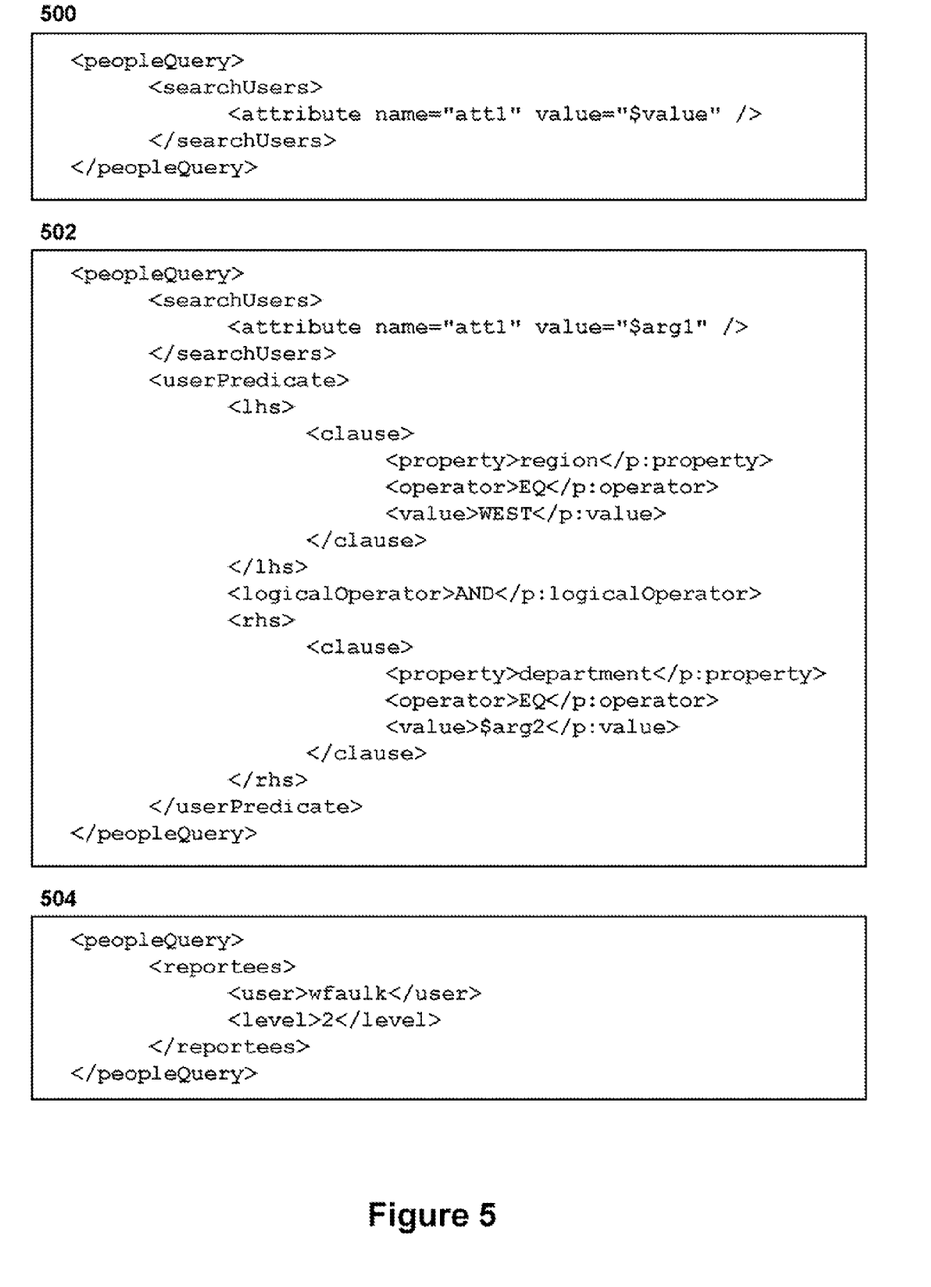
FIG. 5 shows additional exemplary people queries, in accordance with an embodiment.

FIG. 5 shows additional exemplary people queries, in accordance with an embodiment. For example, an LPG 500 can be defined as searching a user directory or other identity store by attribute 'att1'. The attribute value is not defined in the query itself, instead the attribute value is determined at run time using a context map. A people query can also be constructed which filters the search results based on a user predicate. In another example, an LPG 502 is defined using a user predicate. The user directory is searched and the set of users having attribute att1, having a value equal to arg1, is returned. This set of users is then filtered based on the user predicate which defines users having a region property equal to 'WEST' and a department property equal to arg2. Arg1 and arg2 are dynamically set at runtime using the context map. Additionally, in accordance with an embodiment, a people query can be constructed that defines a LPG as including all users who report to a particular user, within a given degree. For example, an LPG 504 can be defined as the set of users up to a second level who report to the user 'wfaulk'.

Figure 6:
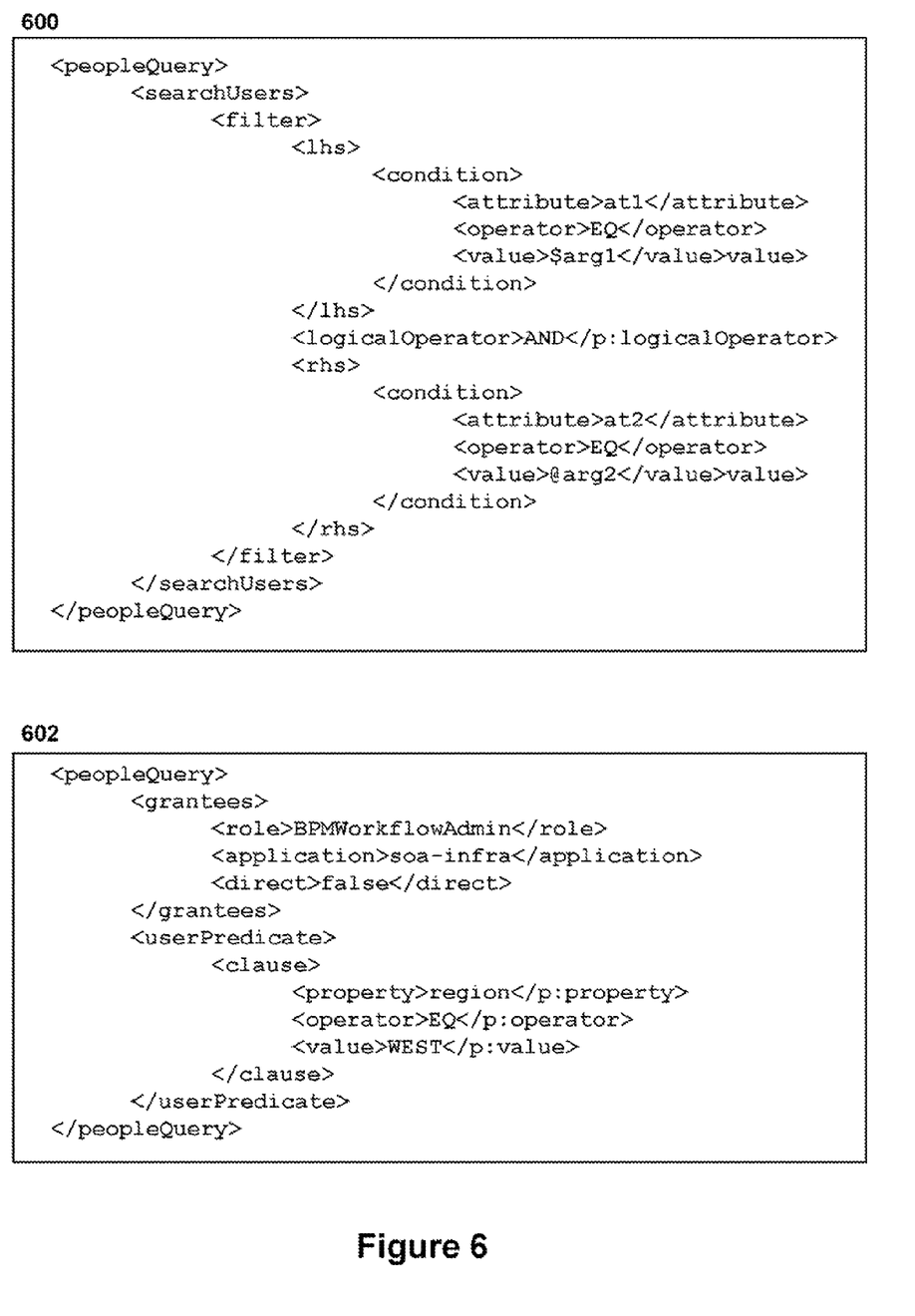
FIG. 6 shows additional exemplary people queries, in accordance with an embodiment.

FIG. 6 shows additional exemplary people queries, in accordance with an embodiment. The people query example 600 shown therein illustrates how a user directory can be searched using a complex query. Rather than searching the user directory based on a single attribute, as shown in the examples of FIG. 5, the user directory can be searched based on two attributes 'at1' and 'at2'. The returned set of users from this people query will be those users in the user directory having both attributes. The attribute values can be set dynamically at runtime, as in this example, or statically defined in the query. Although example 600 uses two attributes, complex queries can be defined with any number of attributes, as needed.

FIG. 6 also shows, a people query 602 which defines a set of users having a particular role and a particular property. In the example of 602, the query will return members of the BPMWorkflowAdmin role from the application soa-infra from the west region.

Figure 7:
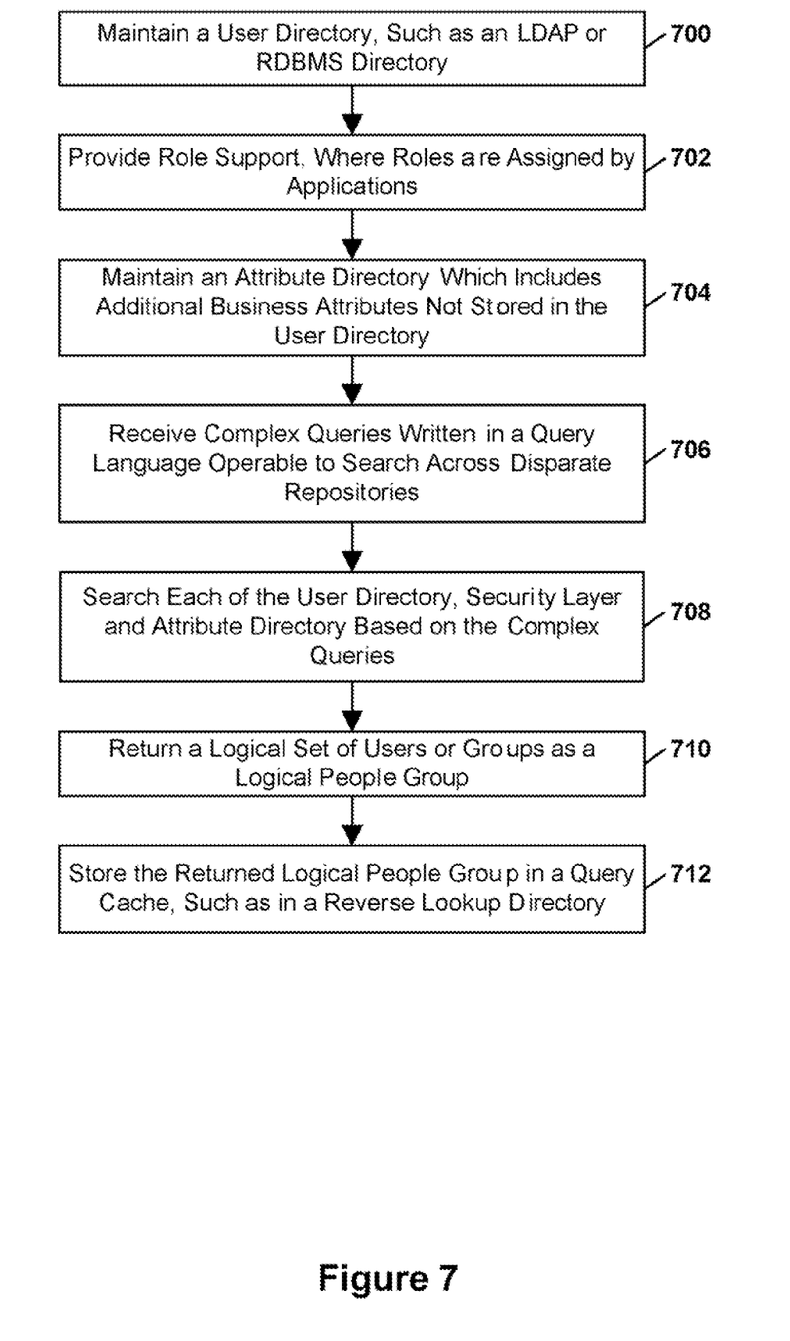
FIG. 7 shows a flowchart of a method for managing a logical people group, in accordance with an embodiment.

FIG. 7 shows a flowchart of a method for managing a logical people group, in accordance with an embodiment. At step 700, a user directory which maps a plurality of users to a plurality of groups is maintained. The user directory also includes a plurality of properties defined for each of the plurality of users. At step 702, roles are supported. Each role includes one or more users from the plurality of users and can be specific to an application. Roles can also be used for security with a security layer. At step 704, an attribute directory which includes plurality of attributes for each of the plurality of users is maintained. At step 706, complex queries are received. Each complex query identifies a logical set of users or groups. At step 708, each of the user directory, the roles and the attribute directory are searched based on the complex queries. At step 710 logical group of users is returned based on the search. At step 712, the results are stored in an query cache, for a user-definable period, as a reverse lookup table based on previously received complex queries.

In accordance with an embodiment, in addition to assigning tasks to logical people groups, a client can request to which logical people groups a user belongs. This can be determined using a reverse lookup directory. However, populating a reverse lookup directory can require executing all current queries, which is time and processor intensive. Accordingly, in accordance with an embodiment, a query cache can be used to store the results of statically defined logical people groups. The query cache can be a persistent cache which can be configured to persist for a user-definable time period. Because both statically defined and parameterized queries can be modified at any time, the cache can also be configured to regularly update its contents by executing current queries at user-definable intervals.

In accordance with an embodiment, a query cache can be maintained which stores previous people queries in a reverse lookup directory. If a query is conducted to determine to which LPGs a user belongs, a complete answer can require executing all currently defined queries. This can cause performance issues, as running a large number of queries across several data repositories can require significant processing resources and time. However, a query cache can be used to store the results of previously conducted queries. In accordance with an embodiment, the cache can store the results as a reverse lookup directory, thus a search of the cache by user can result in a list of LPGS to which that user belongs.

In accordance with an embodiment, the query cache can be configured to populate itself by running currently defined queries in the background at scheduled intervals. Each query can be associated with an expiration time. When the query expires, the system can execute the query and update the query cache accordingly, for example by adding new users and removing old users from being associated with that query.

In accordance with an embodiment, an administrator can schedule query execution and set expiration times for the queries. As a query expires, the cache executes the query. However, each query does not have to be executed immediately after expiration. The previously stored results of the query can be kept accessible for a set time period, or the results can be kept accessible indefinitely with the expiration time, or time of last execution, noted.

The present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, although several of the embodiments described above illustrate the use of the Oracle Human Workflow system, and the use of BPEL, it will be evident that other human workflow or workflow systems, and other flow languages can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for managing a logical people group (LPG), comprising:
    a computer, including a computer memory and processor;
    a user directory which includes a first plurality of attribute values for each of a plurality of users and the user directory maps the plurality of users to a plurality of groups;
    an attribute directory, separate from the user directory, which includes a second plurality of attribute values for each of the plurality of users, which second plurality of attribute values are not recorded in said user directory and the attribute directory maps a plurality of business attributes to the plurality of users;
    a security layer, separate from the user directory and attribute directory, which includes a third plurality of attribute values for each of the plurality of users, which third plurality of attribute values are not recorded in said user directory or attribute directory and the security layer includes a plurality of roles, wherein each role is associated with an application and includes one or more users from the plurality of users;
    a query module including a query cache executing on the computer, operable to receive a complex query wherein the complex query includes a first parameter operable on the first plurality of attribute values, a second defined parameter operable on the second plurality of attribute values, and a third parameter operable on the third plurality of attribute values;
    wherein, in response to the complex query, the query module,
        searches the user directory and identifies a first subset of the plurality users having attribute values satisfying the first parameter,
        searches the attribute directory and identifies a second subset of the plurality of users having attribute values satisfying the second parameter,
        searches the security layer and identifies a third subset of the plurality users having attribute values satisfying the third parameter,
        compares the first subset, the second subset, and the third subset,
        returns an LPG comprising a logical group of a plurality of users present in all of the first subset, the second subset, and the third subset, wherein the LPG is defined by the complex query, and
        stores the LPG in a query cache which stores, for a user-definable period, LPGs based on previously received complex queries.

2. The system of claim 1 wherein the query cache includes an expiration period for each stored LPG.

3. The system of claim 2 wherein after the expiration period for a LPG expires, the query cache reexecutes a complex query associated with the LPG in the background and updates the query cache.

4. The system of claim 1 wherein a complex query comprises:
    at least one parameter to be evaluated at execution; and
    at least one statically defined parameter.

5. The system of claim 1 wherein the complex query includes at least one parameter operable on a role attribute.

6. The system of claim 1, wherein the user directory is a Lightweight Directory Access Protocol (LDAP) compliant directory.

7. A method for managing logical people groups (LPGs), comprising:

maintaining a user directory which includes a first plurality of attribute values for each of a plurality of users and the user directory maps the plurality of users to a plurality of groups;

maintaining an attribute directory, separate from the user directory, which includes a second plurality of attribute values for each of the plurality of users, which second plurality of attribute values are not recorded in said user directory and the attribute directory maps a plurality of business attributes to the plurality of users;

maintaining a security layer, separate from the user directory and attribute directory, which includes a third plurality of attribute values for each of the plurality of users, which third plurality of attribute values are not recorded in said user directory or attribute directory and the security layer includes a plurality of roles, wherein each role is associated with an application and includes one or more users from the plurality of users;

providing a query module executing on a computer including a memory, and a processor;

providing a query cache which stores, for a user-definable period, LPGs based on previously received complex queries;

receiving a complex query with the query module, wherein the complex query includes a first parameter operable on the first plurality of attribute values, a second parameter operable on the second plurality of attribute values, and a third parameter operable on the third plurality of attribute values;

searching the user directory with the query module and identifying a first subset of the plurality users having attribute values satisfying the first parameter, searching the attribute directory with the query module and identifying a second subset of the plurality of users having attribute values satisfying the second parameter;

searching the security layer with the query module and identifying a third subset of the plurality of users having attribute values satisfying the third parameter;

comparing the first subset, the second subset, and the third subset;

returning a logical group of users (LPG) including a plurality of users present in all of the first subset, the second subset, and the third subset, wherein the LPG is defined by the complex query, and storing the LPG in the query cache.

8. The method of claim 7, further comprising:
including in the query cache an expiration period for each stored LPG; and
re-executing a complex query associated with a particular LPG in the background and updating the query cache when the expiration period for the particular LPG expires.

9. The method of claim 7, wherein the complex query comprises:
at least one parameter to be evaluated at execution; and
at least one statically defined parameter.

10. The method of claim 7, wherein the complex query includes at least one parameter operable on a role attribute.

11. The method of claim 7, wherein the complex query includes at least one parameter operable on an application attribute.

12. The method of claim 7, further comprising:
maintaining a reverse lookup directory for a plurality of current LPGs associated with a plurality of complex searches wherein the reverse lookup directory identifies to which of said plurality of current LPGs each of said plurality of users belongs;

executing each of the complex searches associated with said plurality of current LPGs and storing results in said query cache; and updating the query cache, at a user-definable interval by re-executing each of the complex searches associated with said plurality of current LPGs and storing updated results in said query cache.

13. The method of claim 7, wherein providing a query cache comprises providing a persistent query cache.

14. The method of claim 7, wherein maintaining a user directory comprises maintaining a Lightweight Directory Access Protocol (LDAP) compliant user directory.

15. A non-transitory computer readable storage medium including instructions for managing logical people groups (LPGs), which instructions, when executed by a computer, cause the computer to perform steps comprising:

maintaining a user directory which includes a first plurality of attribute values for each of a plurality of users and the user directory maps the plurality of users to a plurality of groups;

maintaining an attribute directory, separate from the user directory, which includes a second plurality of attribute values for each of the plurality of users, which second plurality of attribute values are not recorded in said user directory and the attribute directory maps a plurality of business attributes to the plurality of users;

maintaining a security layer, separate from the user directory and attribute directory, which includes a third plurality of attribute values for each of the plurality of users, which third plurality of attribute values are not recorded in said user directory or attribute directory and the security layer includes a plurality of roles, wherein each role is associated with an application and includes one or more users from the plurality of users;

providing a query module executing on a computer including a memory, and a processor;

providing a query cache which stores, for a user-definable period, LPGs based on previously received complex queries;

receiving a complex query with the query module, wherein the complex query includes a first parameter operable on the first plurality of attribute values, a second parameter operable on the second plurality of attribute values, and a third parameter operable on the third plurality of attribute values;

searching the user directory with the query module and identifying a first subset of the plurality users having attribute values satisfying the first parameter, searching the attribute directory with the query module and identifying a second subset of the plurality of users having attribute values satisfying the second parameter;

searching the security layer with the query module and identifying a third subset of the plurality of users having attribute values satisfying the third parameter;

comparing the first subset, the second subset, and the third subset;

returning a logical group of users (LPG) including a plurality of users present in all of the first subset, the second subset, and the third subset, wherein the LPG is defined by the complex query, and storing the LPG in the query cache.

16. The non-transitory computer readable storage medium of claim 15, which includes instructions which cause the computer to perform steps further comprising:
including in the query cache an expiration period for each stored LPG; and re-executing a complex query associated with a particular LPG in the background and updating the query cache when the expiration period for the particular LPG expires.

17. The non-transitory computer readable storage medium of claim 15, which includes instructions which cause the computer to perform steps further comprising:
   maintaining a reverse lookup directory for a plurality of current LPGs associated with a plurality of complex searches wherein the reverse lookup directory identifies to which of said plurality of current LPGs each of said plurality of users belongs;
   executing each of the complex searches associated with said plurality of current LPGs and storing results in said query cache; and
   updating the query cache, at a user-definable interval by re-executing each of the complex searches associated with said plurality of current LPGs and storing updated results in said query cache.

18. The non-transitory computer readable storage medium of claim 15, wherein providing a query cache comprises providing a persistent query cache.

19. The non-transitory computer readable storage medium of claim 15, wherein maintaining a user directory comprises maintaining a Lightweight Directory Access Protocol (LDAP) compliant user directory.

* * * * *

UNITED STATES PATENT AND TRADEMARK OFFICE
CERTIFICATE OF CORRECTION

PATENT NO. : 8,819,055 B2
APPLICATION NO. : 12/780214
DATED : August 26, 2014
INVENTOR(S) : Rangaswamy et al.

It is certified that error appears in the above-identified patent and that said Letters Patent is hereby corrected as shown below:

On the Title Page, Item (56)

On page 2, column 2, under Other Publications, line 2, delete "1Og" and insert -- 10g --, therefor.

On page 2, column 2, under Other Publications, line 15, delete "Colaxa" and insert -- Collaxa --, therefor.

On page 2, column 2, under Other Publications, line 30, delete "Interoperabilitity" and insert -- Interoperability --, therefor.

Signed and Sealed this
Tenth Day of March, 2015

Michelle K. Lee
*Deputy Director of the United States Patent and Trademark Office*